United States Patent

Freeman

[11] Patent Number: 5,947,379
[45] Date of Patent: Sep. 7, 1999

[54] DISPENSER FOR SCENTED MATERIAL

[75] Inventor: Barry G. Freeman, Fort Mill, S.C.

[73] Assignee: Camo-Camouleaf, Inc., Pineville, N.C.

[21] Appl. No.: 08/924,872

[22] Filed: Sep. 5, 1997

[51] Int. Cl.[6] ................................................. A01M 31/06
[52] U.S. Cl. ............................................. 239/52; 239/53
[58] Field of Search .................... 43/1, 2, 131; 242/397; 239/44, 47, 48, 51, 52, 53, 55, 56

[56] References Cited

U.S. PATENT DOCUMENTS

| | | | |
|---|---|---|---|
| 2,786,714 | 3/1957 | Salewy | 239/50 X |
| 4,773,177 | 9/1988 | Gray, II et al. | |
| 4,788,787 | 12/1988 | Stewart | |
| 4,964,744 | 10/1990 | Whitcar | 239/48 X |
| 5,074,439 | 12/1991 | Wilcox | |
| 5,161,646 | 11/1992 | Aurich et al. | |
| 5,220,741 | 6/1993 | Burgeson | |
| 5,263,274 | 11/1993 | Speed | |
| 5,307,584 | 5/1994 | Jarvis | |
| 5,555,663 | 9/1996 | Burgeson | |
| 5,622,314 | 4/1997 | Easo | 239/47 |

FOREIGN PATENT DOCUMENTS 446228   10/1944   Canada ....................................... 239/50

*Primary Examiner*—Kevin Weldon
*Attorney, Agent, or Firm*—Kennedy, Covington, Lobdell, & Hickman, LLP

[57] ABSTRACT

A dispenser for scented material for use during hunting includes a container body defining a cavity therein with the cavity being divided into a first compartment and a second compartment by a wall member. A reel is rotatably mounted in the first compartment and a line is trained around the reel to extend from the first compartment through the second compartment and outwardly into the atmosphere for selected payout of the line from the container body. An absorbent member is disposed within the second compartment for impregnation with animal scent material and includes an opening formed therein for passage there through of the line with the line being in contact with the absorbent material for deposit of a portion of the animal scent material on the line as it is paid out from the reel with a line retaining a portion of the animal scent material thereon after the line has entered the atmosphere from the cavity.

11 Claims, 3 Drawing Sheets

DISPENSER FOR SCENTED MATERIAL

BACKGROUND OF THE INVENTION

The present invention relates broadly to liquid material dispensers and, more particularly, to a dispenser for scented material for use during hunting with the scented material being preferably in liquid form.

Hunters will employ several techniques to lure game animals such as deer to a desired area. The scents that are used include urine from the hunted animal, or estrus scent. Such scented lures are typically available as liquid concentrates. Other concentrated scents are available to mask the human scent. These include animal musk, pine, cedar, and urine from animals indigenous to the hunting area.

The concentrated scent may be dispensed in may ways. Initially, they may be applied directly to clothing. This technique has the disadvantage that the concentrated scent can be repulsive and can linger after the hunting event has concluded. Mechanical dispensers are also used. A typical type of dispenser is some form of scent container which can be suspended from a tree. This type of dispenser is disclosed in Burgeson U.S. Pat. No. 5,555,663; Aurich et al U.S. Pat. No. 5,161,646; and Stuart U.S. Pat. No. 5,048,218. All of these dispensers are characterized by large containers which can add to the burden of equipment that a hunter must carry. A reel and line system is disclosed in Konietzki U.S. Pat. No. 4,788,787. There, a complex reel container is provided with a plug in the center. If the plug is removed, the container may be filled with the scented material which soaks a line contained on an internal reel. The line may be paid out from the reel for attachment to a tree or a support structure. One problem with this device is that the line becomes completely soaked with the scented material which can provide the same sort of disadvantages as the clothing impregnation technique.

There accordingly exists a need for a dispenser for scented material for use during hunting which can provide a compact package and can impregnate a line for extension from a support structure without soaking the line to thereby control the distribution of the scented material, be it lure or masking scent.

SUMMARY OF THE INVENTION

It is accordingly a object of the present invention to provide a simple reel and line type dispenser that provides is controlled impregnation of a line with scented material for use during hunting.

To that end, a dispenser for scented material for use during hunting includes a container body defining a cavity therein, the container body including an arrangement for defining a first compartment and a second compartment within the cavity with the first compartment being in communication with the second compartment and the container body having a first access opening to the first compartment and a second access opening to the second compartment formed therein. The dispenser further includes a reel rotatably mounted within the first compartment, a line trained around the reel and extending from the first compartment through the second compartment and outwardly into the atmosphere from the container body for selected payout of the line from the container body and an absorbent member disposed within the second compartment for impregnation with scented material and having an opening formed therein for passage therethrough of the line, with the line being in contact with the absorbent material for deposit of a portion of the animal material on the line as the line is paid out from the reel, with the line retaining a portion of the scented material thereon after the line has entered the atmosphere from the cavity.

The present invention further includes a hand crank mounted to an outer surface of the container body and operatively connected to the reel for selected rotary movement of the reel to selectively move the line into the cavity.

Preferably, the dispenser include a cover in removable covering relation with the first access opening and another cover in removable covering relation with the second access opening. The container body may be formed as generally as a cylinder and includes threads formed thereon adjacent to first access opening and the cover associated with the first compartment includes complementary threads for retaining the cover in covering relation with the first access opening by mating engagement of the threads. The container body preferably also includes threads formed thereon adjacent to second access opening and the cover associated with the second compartment includes complementary threads for retaining the cover in covering relation with the second access opening by mating engagement of the threads. A gasket is preferably disposed intermediate the cover associated with the first access opening and the container body. Another gasket is preferably disposed immediate the cover associated with the second access opening and the container body.

Preferably, the present invention includes a hook attached to one end of the line to assist in mounting the device on a support structure. It is further preferred that the absorbent material be formed as a sponge.

By the above, the present invention provides a compact, simple dispenser for scented material for use during hunting which is resistant to leaks and is economical in its use of concentrated liquid scented material.

DESCRIPTION OF THE PREFERRED EMBODIMENT

Figure 1:
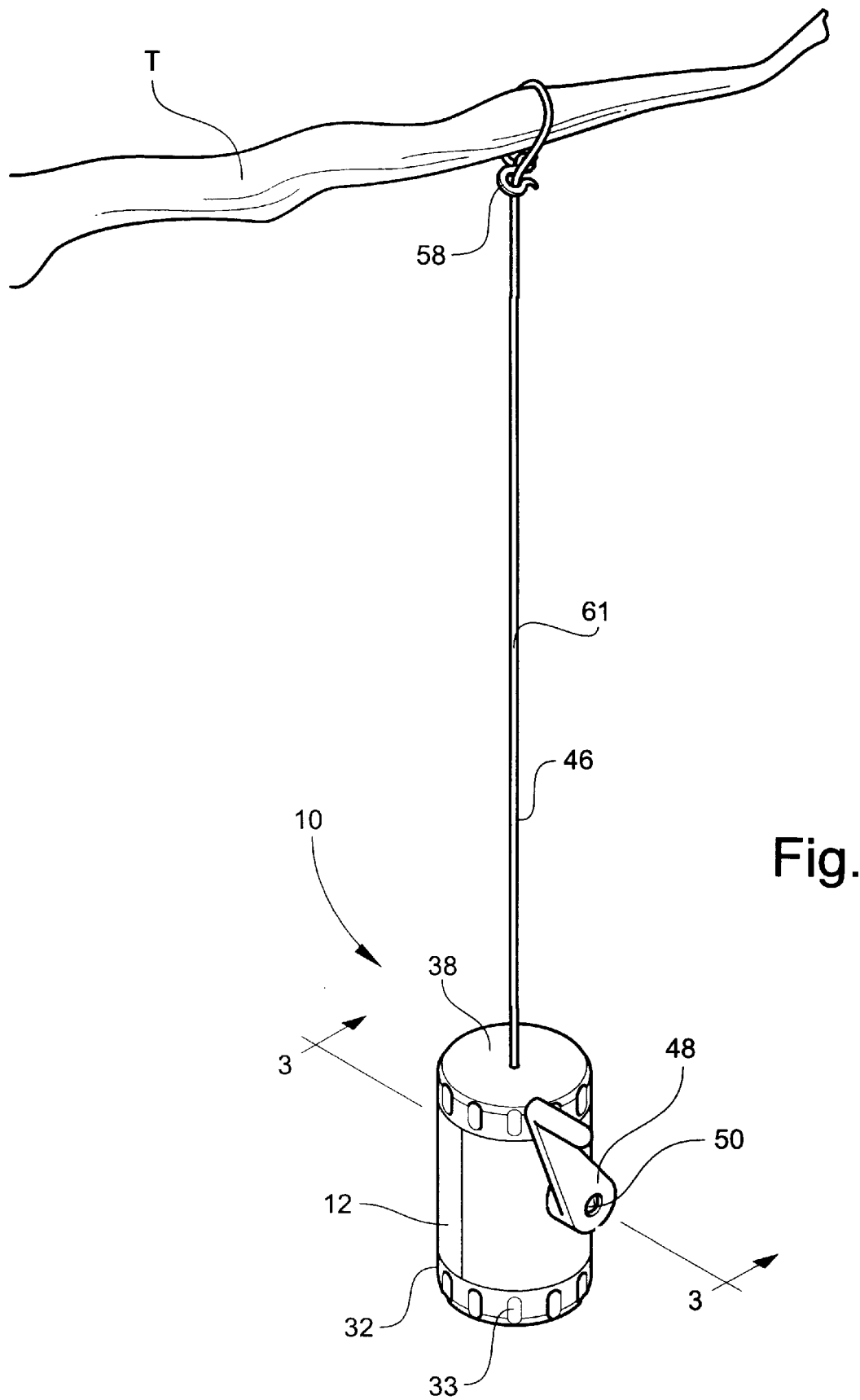
FIG. 1 is a perspective view of a dispenser for scented material for use during hunting according to the preferred embodiment of the present invention and illustrated in its environment.

Turning now to the drawings and, more particularly, to FIG. 1, a dispenser for scented material for use during hunting according to the preferred embodiment of the present invention is illustrated generally a 10 and is shown attached to a support member, here a tree T, in a manner illustrating the environment of the present invention during use. As seen in FIG. 1, the present invention includes a cylindrical body 12 having a first end cap 32 and a second end cap 38 attached thereto. The end caps 32,38 include indentions 33 around the perimeter thereof for enhanced gripping action. A line 46 projects outwardly from the second end cap 38 and is impregnated with scented material 61. The scented material may be a lure such as urine or estrus scent, or it may be a scent to mask the hunters own human scent, including urine of animals indigenous to the hunting area, animal musk, pine, cedar, or some other scent. The line extends between the device 10 and the support tree T around which the line is trained with a hook 58 at the distal end of the line for engagement with another portion of the line to retain the device suspended from the tree T. In order to retract the line back into the container when the device period of usefulness has ended, a hand crank 48 is provided and is attached to the device 10 with a screw 50 as will be explained in greater detail hereinafter. FIG. 1 illustrates the device in its environment and illustrates the external portions of the device 10.

Figure 2:
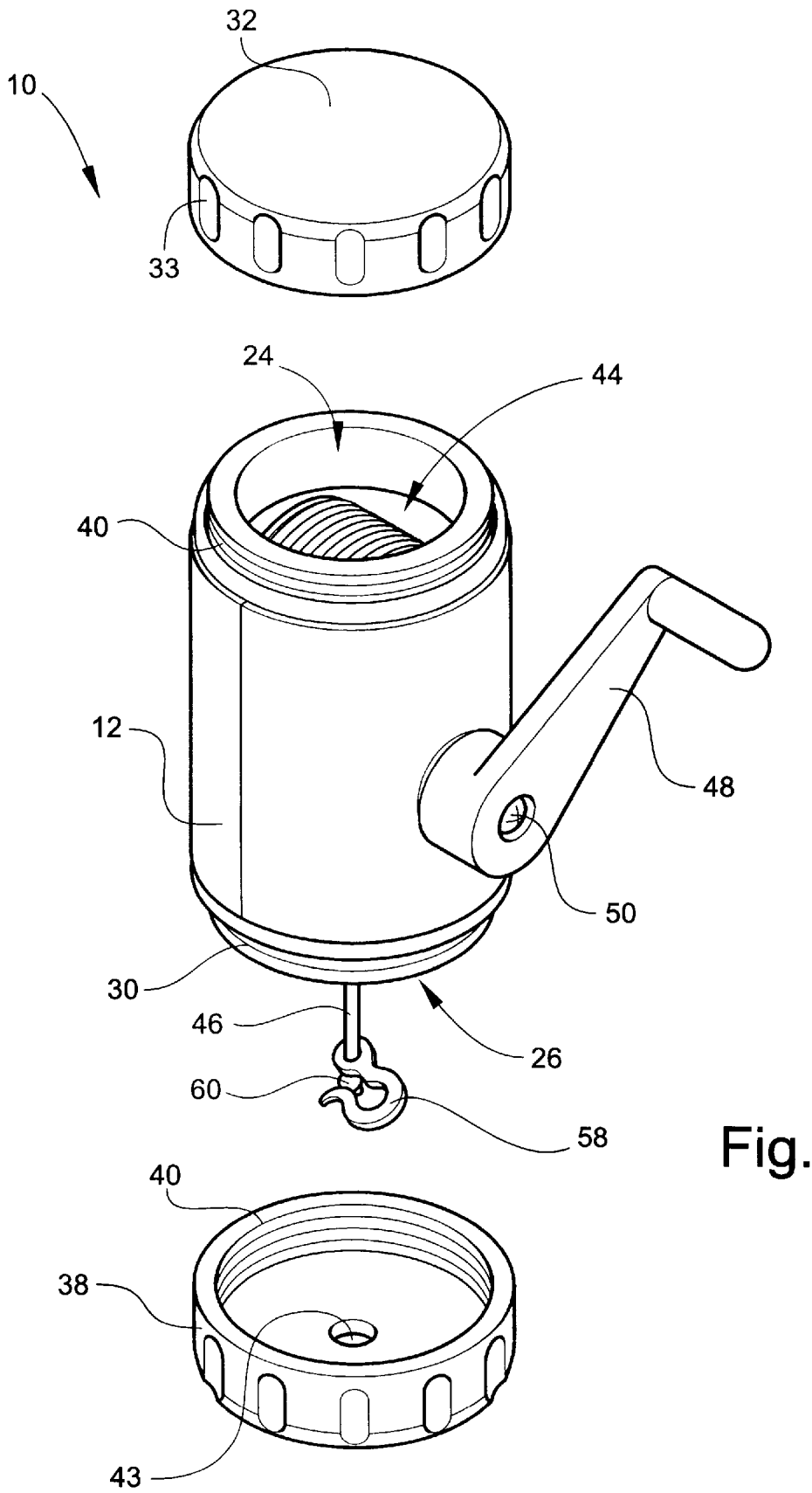
FIG. 2 is an exploded view of the dispenser illustrated in FIG. 1.

Turning now to FIG. 2, it can be seen that the device is inverted from the view illustrated in FIG. 1. There, it can be seen that the cylindrical container includes threads 30, 40 formed at either end thereof. The second end cap 38 includes internal, complementary threads 40 for engagement with the container body threads 30 to cover that end of the device 10. The second cap 38 includes an opening 43 through which the line 46 may pass. It will be appreciated that the hook 58 must be removed from the line 46 before the cap 38 may be removed completely as illustrated in FIG. 2. Nevertheless, it will be simple to leave the hook 48 in place, extend a portion of the line sufficient to allow the cap 38 to be displaced from the container body 12 sufficiently to insert the scented material as will be seen in greater detail hereinafter. The first cap 32 includes internal threads 34 as illustrated in FIG. 3.

Figure 3:
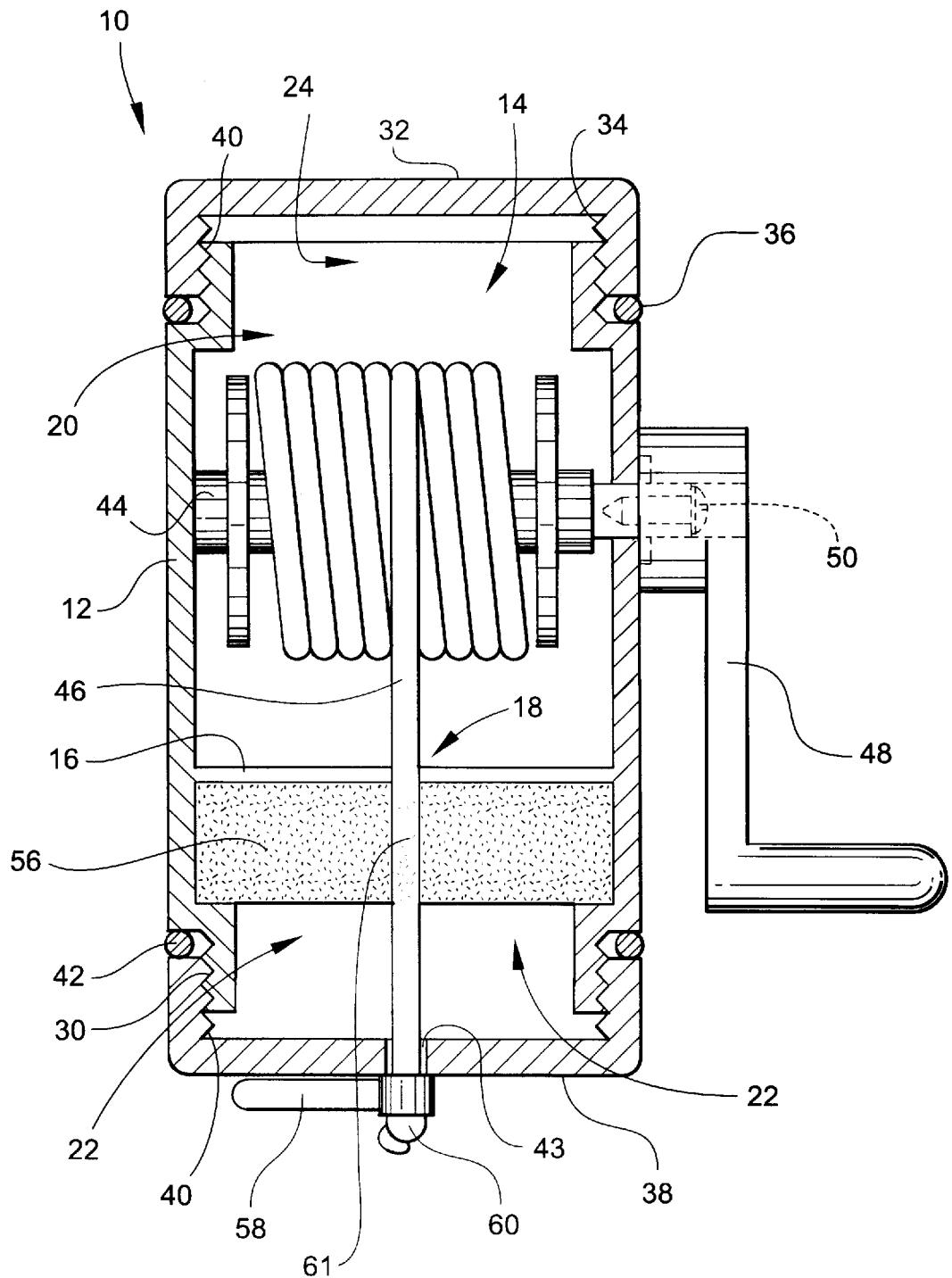
FIG. 3 is a cross-sectional view of the dispenser illustrated in FIG. 1 taken through line 3—3 of FIG. 1.

With continued reference to FIG. 3, the container body 12 is illustrated in cross-section. There, it can be seen that the body 12 includes a cavity 14 which is divided into a first compartment 20 and a second compartment 22 by an internal, washer-like dividing wall 16 which integrally formed with the container body 12. An opening 18 is formed in the dividing wall 16 to allow the line 40 to pass therethrough. The container body also defines a first access opening 24 into the first compartment 20 and a second access opening 26 into the second compartment 22. In order to help contain any fluid within the dispenser 10, a gasket 36, formed as an o-ring is disposed intermediate the first cap 32 and the container body 12. A similar gasket 42 is disposed intermediate the second cap 38 and the container body 12.

A spool-like reel 44 is rotatably mounted internally within the first compartment 20. The line 46 is trained around the reel 44 for selected payout and takeup thereof. The line 46 is preferably formed from jute or some other absorbent material.

In order to selectively rotate the reel 44 for takeup of the line 46, a hand crank 48 is mounted to the reel 44 to extend through the container body 12 using a conventional screw 50. Therefore, rotation of the hand crank 48 causes rotation of the reel 44. It should be noted that any form of gear system, or pulley system, could be used intermediate the hand crank 48 and the reel 44 for a mechanical advantage, but is not a requirement.

The second compartment 22 contains the absorbent member 56. The absorbent member 56 is formed as a washer-like sponge and is disposed in the second compartment 22 in abutment with the dividing wall 16. This washer-like sponge 56 is used for neatness but it will be understood by those skilled in the art that virtually any absorbent material may be used whether it is foam, a sponge, or even some form of textile batting. Any material that can contain a quality of liquid may be used as the absorbent material so long as it will fit within the second compartment 22. It should be further noted that while the primary focus of the present invention is on the dispensing of liquid animal scents, it will be appreciated by those skilled in the art that the animal scents may take other forms including a wax-like solid or even a gel. The only requirement be that the scent can be contained within the second compartment 22 and that the scent carrying vehicle can make contact with the line 46 to transfer a quantity of scented material 61 to the line 46. In the present case, the line 46 is directed through the absorbent material 56 for contact along the complete outer surface of the line 46 to transfer the scented material 61 to the line 46 as it is withdrawn from the container body 12. As previously stated and as seen in FIG. 1, the hook 58 is attached to the line 46 at one end thereof and is prevented from sliding off the line 46 by knot 60 tied in the line 46.

In operation, the second cap 38 is unscrewed from the container body 12 and withdrawn to reveal the absorbent material 56 disposed within the second compartment 22. The liquid animal scent material is poured into the second compartment 22 and absorbed by the absorbent material 56. The second cap 38 is then replaced and to the device is in condition for use. It will be appreciated by hunters that the device is sufficiently small to carry in a pocket or its own designated pouch. At the hunting site, the line 61 is withdrawn from the container in a manner illustrated in FIG. 1. This causes the line 46 to be drawn through the absorbent material 56 and contact between the absorbent material 56 and the line 46 causes scented material 61 to become impregnated in the line as it is withdrawn. Once the line is fully extended, it may be suspended from a tree T or other support structure as seen in FIG. 1 and the hook 58 engaged with a downwardly projecting portion of the line 46 to retain the line snugly against the support structure. Exposure of the line 46 to the atmosphere causes the scented material 61 to permeate into the atmosphere for receipt by game animals.

By the above, the present invention provides a simple and neat device for containing scented material which can distribute the scented material into the surrounding atmosphere.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A dispenser for scented material for use during hunting, the dispenser comprising:

a container body defining a cavity therein, said container body including means for defining a first compartment and a second compartment within said cavity, said first compartment being in communication with said second compartment, said container body having a first access opening to said first compartment and a second access opening to said second compartment formed therein;

a reel rotatably mounted within said first compartment;

a line trained around said reel and extending from said first compartment through said second compartment and outwardly into the atmosphere from said container body for selected payout of said line from said container body; and an absorbent member disposed within said second compartment for impregnation with scented material, and having an opening formed therein for passage therethrough of said line, with said line being in contact with said absorbent material for deposit of a portion of said scented material on said line as said line is paid out from said reel, with said line retaining a portion of said scented material thereon after said line has entered the atmosphere from said cavity.

2. A dispenser for scented material for use during hunting according to claim 1 and further comprising a hand crank mounted to an outer surface of said container body and operatively connected to said reel for selected rotary movement of said reel to selectively move said line into said cavity.

3. A dispenser for scented material for use during hunting according to claim 1 and further comprising a cover in removable covering relation with said first access opening.

4. A dispenser for scented material for use during hunting according to claim 1 and further comprising a cover in removable covering relation with said second access opening.

5. A dispenser for scented material for use during hunting according to claim 3 wherein said container body is formed generally as a cylinder and includes threads formed thereon adjacent said first access opening and said cover associated with said first compartment includes complementary threads for retaining said cover in covering relation with said first access opening by mating engagement of said threads.

6. A dispenser for scented material for use during hunting according to claim 4 wherein said container body is formed generally as a cylinder and includes threads formed thereon adjacent said second access opening and said cover associated with said second compartment includes complementary threads for retaining said cover in covering relation with said second access opening by mating engagement of said threads.

7. A dispenser for scented material for use during hunting according to claim 3 and further comprising a gasket disposed intermediate said cover associated with said first access opening and said container body.

8. A dispenser for scented material for use during hunting according to claim 4 and further comprising a gasket disposed intermediate said cover associated with said second access opening and said container body.

9. A dispenser for scented material for use during hunting according to claim 1 and further comprising a hook attached to one end of said line to assist in mounting said device on a support structure.

10. A dispenser for scented material for use during hunting according to claim 1 wherein said absorbent material is a sponge.

11. A dispenser for scented material for use during hunting, the dispenser comprising:

a container body formed generally as a cylinder defining a cavity therein, said container body including an inner wall defining a first compartment and a second compartment within said cavity, said wall including an opening for communication of said first compartment and said second compartment, said container body having a first access opening to said first compartment with threads formed on said container body thereat and a second access opening to said second compartment formed therein with threads formed on said container body thereat;

a first cover having threads formed thereon and threadedly attached to said container body in covering relation with said first access opening;

a gasket disposed intermediate said first cover and said container body;

a second cover having threads formed thereon and threadedly attached to said container body in covering relation with said second access opening, said second cover having and opening formed therein for passage of said line therethrough;

a gasket disposed intermediate said second cover and said container body;

a reel rotatably mounted within said first compartment;

a line trained around said reel and extending from said first compartment through said second compartment and outwardly into the atmosphere from said container body for selected payout of said line from said container body;

a hand crank mounted to an outer surface of said container body and operatively connected to said reel for selected rotary movement of said reel to selectively move said line into said cavity; and a sponge disposed within said second compartment for impregnation with scented material, and having an opening formed therein for passage therethrough of said line, with said line being in contact with said absorbent material for deposit of a portion of said scented material on said line as said line is paid out from said reel, with said line retaining a portion of said scented material thereon after said line has entered the atmosphere from said cavity.

* * * * *